United States Patent
Sugimura

(10) Patent No.: US 8,174,420 B2
(45) Date of Patent: May 8, 2012

(54) VIDEO ENCODING APPARATUS AND METHOD HAVING OUTPUT RESTRICTION FUNCTION

(75) Inventor: Akihiro Sugimura, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 1631 days.

(21) Appl. No.: 11/524,081

(22) Filed: Sep. 20, 2006

(65) Prior Publication Data

US 2007/0140332 A1 Jun. 21, 2007

(30) Foreign Application Priority Data

Dec. 20, 2005 (JP) ................................. 2005-366212

(51) Int. Cl.
*H03M 1/66* (2006.01)
(52) U.S. Cl. ........ 341/144; 341/142; 341/155; 345/699; 345/660; 345/667; 345/698; 348/563; 348/554; 348/555; 348/556; 348/558
(58) Field of Classification Search .................. 341/144, 341/155; 345/660, 667, 698, 699; 348/563, 348/554, 555, 556, 558
See application file for complete search history.

(56) References Cited

U.S. PATENT DOCUMENTS

| | | | | |
|---|---|---|---|---|
| 5,870,073 A * | 2/1999 | Kitou et al. | .................... | 345/698 |
| 6,091,397 A * | 7/2000 | Lee | ................. | 345/690 |
| 6,181,318 B1 * | 1/2001 | Lim | ................. | 345/698 |
| 6,239,729 B1 * | 5/2001 | Takeuchi | ..................... | 341/100 |
| 7,170,534 B2 * | 1/2007 | Son et al. | ..................... | 345/659 |
| 7,542,097 B2 * | 6/2009 | Suito | ............................. | 348/555 |
| 7,787,001 B2 * | 8/2010 | Namie et al. | .................. | 345/698 |
| 8,009,182 B2 * | 8/2011 | Shibahara | ..................... | 345/699 |
| 2004/0213053 A1 | 10/2004 | Kato et al. | | |
| 2005/0001932 A1 * | 1/2005 | Masuda et al. | ................ | 348/563 |
| 2005/0207577 A1 | 9/2005 | England et al. | | |
| 2005/0231641 A1 * | 10/2005 | Suito | ............................. | 348/555 |
| 2006/0114275 A1 * | 6/2006 | Kim et al. | ..................... | 345/698 |
| 2007/0176813 A1 * | 8/2007 | Nakayama et al. | ........... | 341/144 |

FOREIGN PATENT DOCUMENTS

| | | |
|---|---|---|
| EP | 1 517 558 | 3/2005 |
| JP | 10-174057 | 6/1998 |
| JP | 2002-218412 | 8/2002 |

(Continued)

OTHER PUBLICATIONS

European Search Report dated Nov. 9, 2011, from corresponding European Application No. 06 02 6213.

(Continued)

*Primary Examiner* — Linh Nguyen
(74) *Attorney, Agent, or Firm* — Katten Muchin Rosenman LLP

(57) ABSTRACT

A video encoding apparatus receives a digital video data signal, converts the digital video data signal into an analog video signal and outputs the analog video signal to an externally connected image device. An encoding processor converts the digital video data signal into the analog video signal. A resolution determination unit compares the resolution of an image represented by the digital video data signal with an externally defined resolution. An output controller refers to a result of comparison by the resolution determination unit and, if the externally defined resolution matches the resolution of the image represented by the digital video data signal, outputs the analog video signal. If the resolutions do not match, the output controller restricts the output of the analog video signal.

15 Claims, 2 Drawing Sheets

FOREIGN PATENT DOCUMENTS

| | | |
|---|---|---|
| JP | 2003-224816 | 8/2003 |
| JP | 2005-25270 | 1/2005 |
| JP | 2005-78997 | 3/2005 |

OTHER PUBLICATIONS

Questioning dated Jan. 19, 2011, from the corresponding Japanese Application.

Notification of Reason(s) for Refusal dated Feb. 3, 2009, from the corresponding Japanese Application.

Decision of Refusal dated Aug. 18, 2009, from the corresponding Japanese Application.

* cited by examiner

VIDEO ENCODING APPARATUS AND METHOD HAVING OUTPUT RESTRICTION FUNCTION

BACKGROUND OF THE INVENTION

1. Field of the Invention

The present invention relates to a video encoding apparatus for converting a digital video data signal into an analog video signal to be output to an image display device.

2. Description of the Related Art

Technological innovations in image display devices have been remarkable in recent years. Image display devices such as plasma TV's and LCD TV's are becoming popular which are compatible with the High Definition (HD) standard which defines a resolution of 1920×1080 or a standard conforming to the HD standard.

In this background, image contents compatible with the HD standard have also become popular. For example, Digital Versatile Discs (DVD) compatible with the next-generation Blu-Ray standard or the HD-DVD standard have been produced. These next-generation DVDs support high-definition HD images. As image contents such as movies are recorded in next-generation DVD media in the form of HD images and are distributed widely, copyright problems like unauthorized duplication might occur.

A next-generation digital interface standard called High Definition Multimedia Interface (HDMI) is established in association with the HD standard. HDMI allows HD images to be transmitted in a digital format, while also providing rigorous digital copyright protection.

Meanwhile, many image display devices with HD resolution capabilities are not provided with HDMI yet and are only provided with a D3 terminal, a D4 terminal or a conventional analog interface such as a component terminal. In this situation, electronic appliances such as DVD players and game devices for outputting an image are designed to interface with an image display device, using two interfaces, namely, HDMI, which is capable of transmitting a digital signal, and a conventional analog interface capable of transmitting an analog video signal.

It will be noted that copyright related problems such as unauthorized duplication are not likely to occur if image data is transmitted to an image display device in the form of a digital signal via HDMI. On the other hand, transmission of high-definition HD images via an analog interface may result in unauthorized duplication of high-quality image data because of poor protective function of the analog interface.

SUMMARY OF THE INVENTION

In this background, a general purpose of the present invention is to restrict the output of high-quality image data via an analog interface as required.

One embodiment of the present invention relates to a video encoding apparatus which receives a digital video signal, converts the digital video signal into an analog video signal and outputs the analog video signal to an externally connected image device. The video encoding apparatus comprises an encoding processor, a resolution determination unit and an output controller. The encoding processor converts the digital video data signal into the analog video signal. The resolution determination unit determines whether the resolution of an image represented by the digital video data signal satisfies a condition determined by an externally defined resolution. The output controller controls the state of output of the analog video signal to the image device. The output controller refers to a result of determination by the resolution determination unit and, if the resolution of the image represented by the digital video data signal does not satisfy the condition, restricts the output of the analog video signal. The video encoding apparatus may be configured as a functional circuit integrated on a semiconductor substrate.

According to this embodiment, even if a user using the device in which the video encoding apparatus is installed analyzes a command for controlling the video encoding apparatus and makes an unauthorized attempt to output a high-resolution analog video signal, the user cannot output the analog video signal with high resolution unless the resolution of the image represented by the digital video data signal satisfies the predetermined condition inside the video encoding apparatus. Consequently, the high-definition analog video signal is prevented from being output to an external destination without any restriction imposed thereon.

Another embodiment of the present invention relates to an electronic appliance which uses the aforementioned video encoding apparatus. The electronic appliance comprises the aforementioned video encoding apparatus and a digital video output unit provided parallel to the video encoding apparatus. The digital video output unit outputs the digital video data signal input to the video encoding apparatus to the externally connected image device in a predetermined digital format.

It is to be noted that any arbitrary combination or rearrangement of the above-described structural components and so forth are all effective as and encompassed by the present embodiments. Moreover, this summary of the invention does not necessarily describe all necessary features so that the invention may also be sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
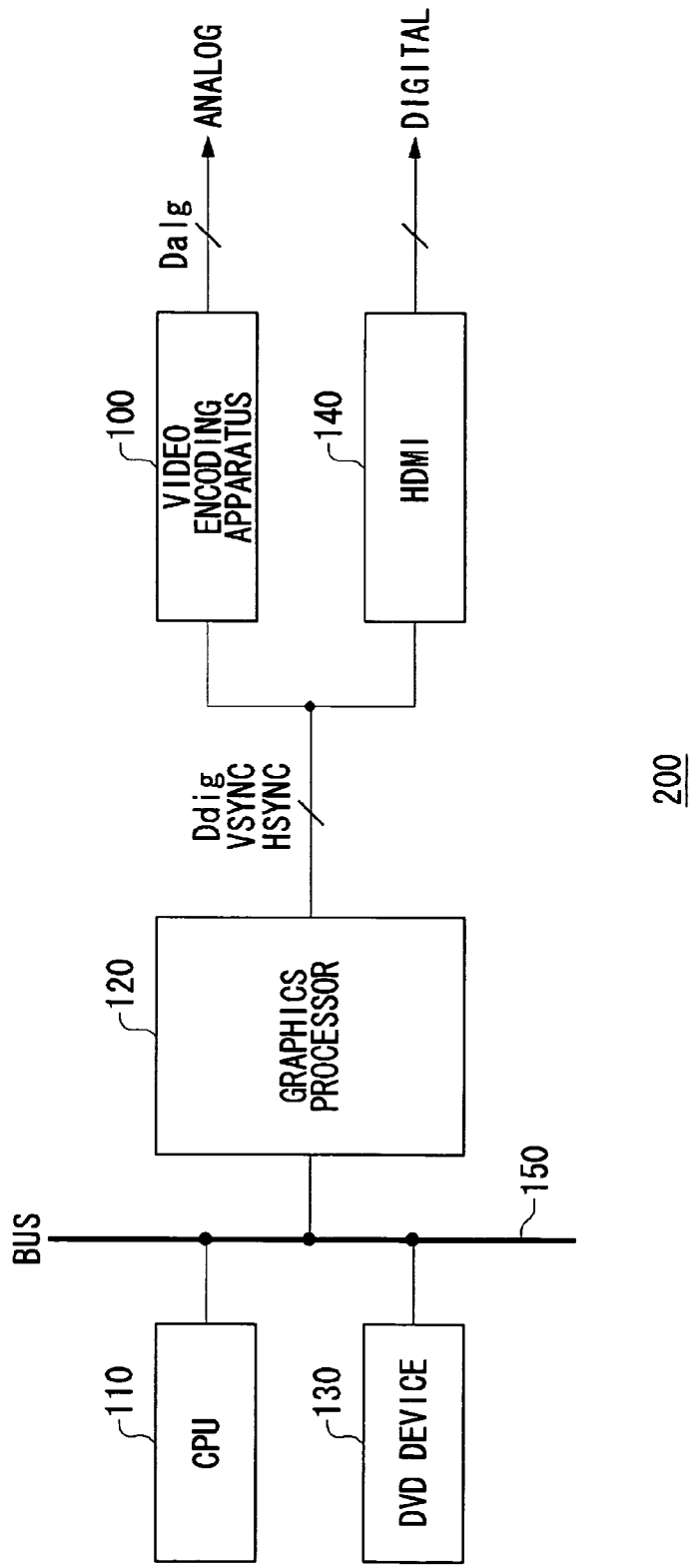
FIG. 1 is a block diagram showing the overall structure of an electronic appliance provided with a video encoding apparatus according to an embodiment of the present invention.

The invention will now be described based on preferred embodiments which do not intend to limit the scope of the present invention but exemplify the invention. All of the features and the combinations thereof described in the embodiment are not necessarily essential to the invention.

A brief summary of a video encoding apparatus and an encoding method according to an embodiment of the present invention will be given. The video encoding apparatus is installed in an electronic appliance such as a personal computer, a DVD player or a game device for outputting image data. The video encoding apparatus converts a digital video data signal generated or reproduced in a digital format by a graphics processor into an analog video signal for output to an external image device. The destination image device may be an image display device such as a plasma TV, an LCD TV, a projector or the like. Alternatively, the analog signal may be output to a DVD recorder, a hard disk (HD) device, a video tape recorder (VTR) or the like.

The video encoding apparatus according to the embodiment of the present invention is provided with an encoding processor, a resolution determination unit and an output controller. The encoding processor converts a digital video data signal into an analog video signal. The resolution determination unit determines whether the resolution of an image represented by the digital video data signal satisfies a condition determined in accordance with an externally defined resolution. The output controller controls the state of output of the analog video signal to the image device. The output controller refers to a result of determination by the resolution determination unit. If the resolution of the image represented by the digital video data signal does not satisfy the above-mentioned condition, the output controller restricts the output of the analog video signal.

"Restriction of the analog video signal" encompasses total suspension of output and outputting of an image with reduced resolution. It means outputting an image substantially different from the image data as originally intended for reproduction. According to the embodiment, the analog signal is output to an external image device without any restriction imposed thereon only when the externally defined resolution and the resolution of the image represented by the digital video data signal satisfy the predetermined condition. Therefore, if a user using the device in which the video encoding apparatus is installed analyzes a command for controlling the video encoding apparatus and makes an unauthorized attempt to output a high-resolution analog video signal, the user cannot output the analog video signal with high resolution unless two resolutions compared match inside the video encoding apparatus. Consequently, the high-resolution analog video signal is prevented from being output without any restriction imposed thereon.

The resolution determination unit may include a resolution detector which detects the resolution of the image represented by the digital video data signal and a condition-based determination unit which determines whether the resolution detected by the resolution detector and the externally defined resolution satisfy a condition determined in accordance with the externally defined resolution. The state of output of the analog signal may be controlled in accordance with an output signal from the condition-based determination unit.

The externally defined resolution may be lower than the high vision resolution. In this case, output of the analog video signal with high vision resolution is restricted.

The output controller may also refer to an externally supplied control signal to restrict the output of the analog video signal. The output controller may include a logic circuit which performs a logical operation on a signal indicating the comparison result from the resolution determination unit so as to restrict the output of the analog video signal in accordance with an output signal from the logic circuit. In this case, robustness in protection is enhanced by imposing restriction on the analog video signal by the control signal and by additionally imposing restriction based on comparison of resolutions.

Restriction on the output state imposed by the output controller may be suspension of output of the analog video signal. The output controller may include a switch provided in a stage subsequent to the encoding processor and suspend the output of the analog signal depending on whether the switch is turned on or off. The output controller may suspend digital-to-analog conversion by the encoding processor when suspending the output. Restriction on the output state imposed by the output controller may be reduction in the resolution of the analog video signal.

The video encoding apparatus described above may be formed as a functional circuit integrally formed on a single semiconductor substrate. In this case, it is difficult to extract signals between circuit blocks or functional blocks, with the result that robustness in protection is enhanced.

Another embodiment of the present invention relates to an electronic appliance. The electronic appliance is provided with the video encoding apparatus according to any of the aforementioned embodiments and a digital video output unit which is provided parallel to the video encoding apparatus and which outputs the digital video data signal input to the video encoding apparatus to an externally connected image device in a predetermined digital format.

Another embodiment of the present invention relates to a video encoding method. The method comprises: receiving a digital video data signal and converting it into an analog video signal to be output to an externally connected image display device; determining whether the resolution of an image represented by the digital video data signal satisfies a condition related to an externally defined resolution; and restricting the output of the analog video signal to the image device if it is determined that the condition is not satisfied.

Arbitrary combinations of the aforementioned constituting elements and implementations of the invention in the form of methods, apparatuses and systems may also be practiced as additional modes of the present invention.

A description will now be given of the details of the video encoding apparatus according to the embodiment with reference to the drawings. FIG. 1 is a block diagram showing the structure of an electronic appliance 200 provided with a video encoding apparatus 100 according to the embodiment. The electronic appliance 200 is, for example, a personal computer, a DVD player or a game device which generates and outputs image data. In this embodiment, it will be assumed that the electronic appliance 200 is a game device. The game device 200 is provided with the function of playing back an image as well as being operated as a game device.

The electronic appliance 200 is provided with the video encoding apparatus 100, a CPU 110, a graphics processor 120, a DVD device 130 and a digital video output unit 140. The blocks are connected to each other via a bus 150. The electronic appliance 200 is configured to output digital image data or analog image data to an externally connected image device (not shown). The elements illustrated in the drawings as functional blocks and circuit blocks executing respective processes are implemented hardwarewise by a CPU, a memory, an LSI, etc. and softwarewise by a program provided with reservation and management functions and loaded into the memory. Therefore, it will be obvious to those skilled in the art that the function blocks may be implemented in a variety of manners including hardware only, software only or a combination of both.

For example, the DVD device 130 may be a next-generation DVD device capable of playing back an image signal of the HD resolution. The DVD device 130 is used to read from an inserted disk a game program for execution in the game device 200 or to play back image data from a disk on which is recorded a movie or music. The game device 200 may be provided with a hard disk device capable of recording and playing back data in place of or in addition to the DVD device 130.

The CPU 110 is a processing unit for overall control of the electronic appliance 200. The CPU 110 reads a game program recorded on a disk inserted in the DVD device 130 into a memory (not shown) and runs the program. If the disk inserted in the DVD device 130 includes image contents such as movies the CPU 110 plays back the contents.

The graphics processor 120 is a block for arithmetic operations related to images (which is defined in this specification to encompass still images and moving images). The graphics processor 120 performs a predetermined process on image data generated as a result of running the game program or image data such as a movie played back by the DVD device 130, so as to output a parallel digital video data signal Ddig along with a vertical synchronization signal VSYNC and a horizontal synchronization signal HSYNC.

An output signal of the graphics processor 120 is output to the video encoding apparatus 100 and the digital video output unit 140. The video encoding apparatus 100 is a functional block for outputting analog image data to an image device provided with an analog input terminal such as an RGB component terminal, an S terminal and a composite terminal. The digital video output unit 140 is provided parallel to the video encoding apparatus 100 and is connected to an image device provided with an interface for a digital signal. The digital video output unit 140 outputs the digital video data signal Ddig in a predetermined digital format to the externally connected image device. The digital video output unit 140 in this embodiment is an interface unit compatible with the HDMI standard. The digital video output unit 140 may be a unit compatible with the Digital Video Interface (DVI) standard instead of HDMI.

Figure 2:
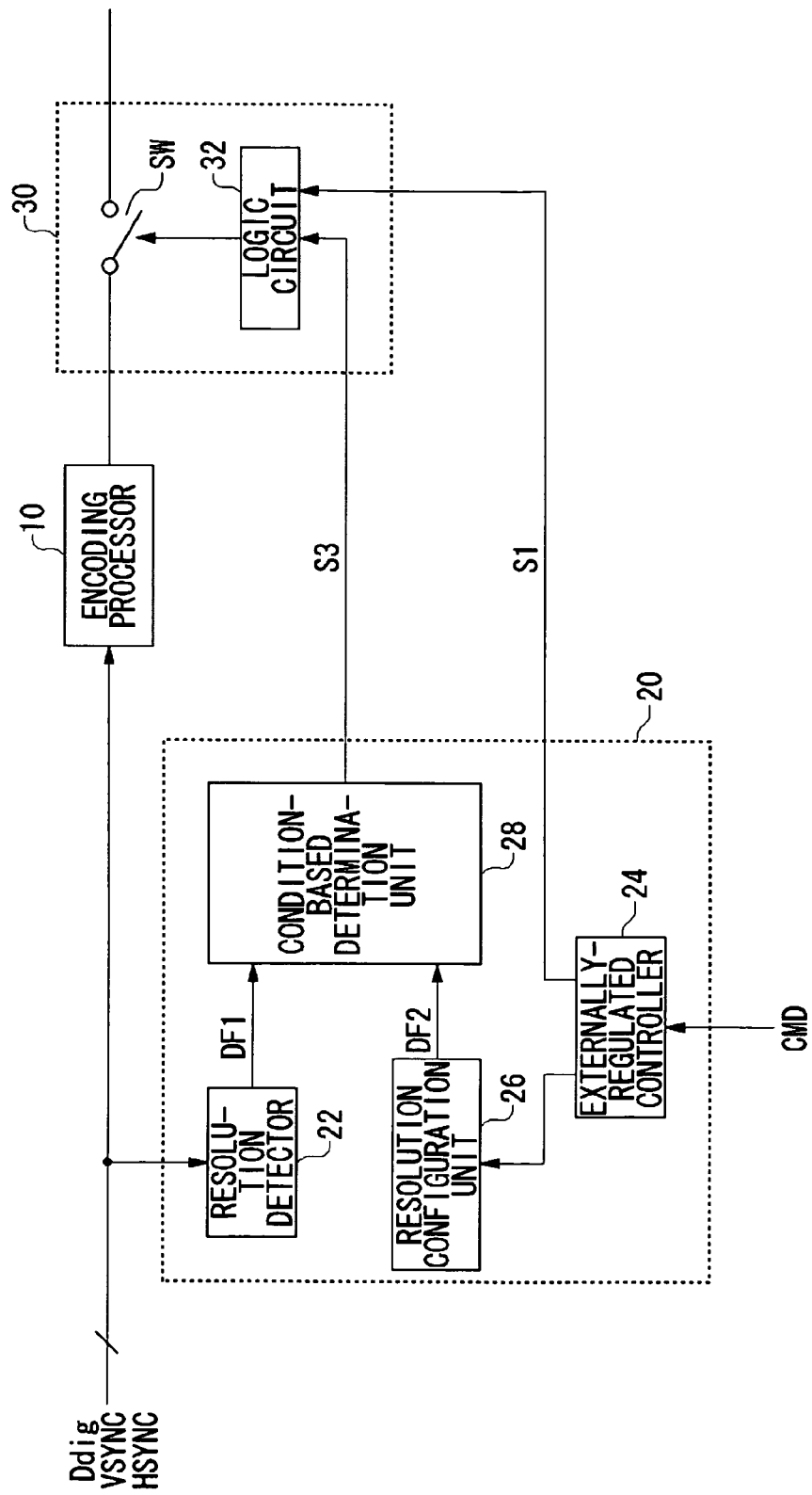
FIG. 2 is a block diagram showing the structure of the video encoding apparatus according to the embodiment.

A detailed description will now be given of the structure of the video encoding apparatus 100. FIG. 2 is a block diagram showing the structure of the video encoding apparatus 100 according to the embodiment. The video encoding apparatus 100 converts the digital video data signal Ddig generated by the graphics processor 120 in a digital format into an analog video signal Dalg and outputs the same to the image device.

The video encoding apparatus 100 receives the digital video data signal Ddig, the vertical synchronization signal VSYNC and the horizontal synchronization signal HSYNC. The video encoding apparatus 100 includes an encoding processor 10, a resolution determination unit 20 and an output controller 30. It is preferable that these are integrated on a semiconductor substrate and configured as functional circuits.

The encoding processor 10 encodes the digital video data signal Ddig for digital-to-analog conversion and outputs the analog video signal Dalg.

The output controller 30 controls the state of output of the analog video signal Dalg to the externally connected image device. The output controller 30 will be described later.

The resolution determination unit 20 determines whether the resolution (hereinafter, also referred to as a first resolution DF1) of the image represented by the digital video data signal Ddig satisfies the condition determined in accordance with the externally defined image resolution (hereinafter, also referred to as a second resolution DF2). In this embodiment, the resolution determination unit 20 determines whether the resolution DF1 of the image represented by the digital video data signal Ddig matches the externally defined image resolution DF2. The resolution determination unit 20 may include a resolution detector 22, an externally-regulated controller 24, a resolution configuration unit 26 and a condition-based determination unit 28.

The resolution detector 22 is a block for detecting the resolution DF1 of the image represented by the digital video data signal Ddig. There are various methods of detecting the resolution. For example, the resolution detector 22 may include first and second counters. In this case, the first counter may count an interval between horizontal synchronization signals HSYNC by using a predetermined clock signal. The second counter may count an interval between vertical synchronization signals VSYNC by using the horizontal synchronization signals HSYNC. Based on these counts, the vertical and horizontal resolutions DF1 of the digital video data signal Ddig input to the video encoding apparatus 100 can be determined. The resolution DF1 may be detected by other methods as well as by the method described above.

The externally-regulated controller 24 controls the video encoding apparatus 100 in accordance with a control signal CMD output from the CPU 110 provided outside the video encoding apparatus 100. For example, the CPU 110 and the externally-regulated controller 24 may communicate with each other by using an I²C (Inter-IC Control) bus.

The CPU 110 performs overall control of the electronic appliance 200 and as such has the knowledge of the contents and resolution of the digital video data signal input to the video encoding apparatus 100. The CPU 110 refers to such information to control the video encoding apparatus via the I²C bus.

The control signal CMD input to the externally-regulated controller 24 of the video encoding apparatus 100 includes various preset values and instructions for controlling the video encoding apparatus 100. The control signal CMD also includes a signal for controlling the output controller 30 and a signal for defining the second resolution DF2. The externally-regulated controller 24 analyzes the control signal CMD and outputs a signal S1 for controlling the output controller 30 to the output controller 30. Further, the externally-regulated controller 24 extracts data S2 indicating the second resolution DF2 from the control signal CMD and outputs the same to the resolution configuration unit 26.

The resolution configuration unit 26 defines the second resolution DF2 in accordance with the data S2 indicating the resolution and output from the externally-regulated controller 24. The second resolution DF2 externally defined by the control signal CMD is output to the condition-based determination unit 28.

The condition-based determination unit 28 compares the first resolution DF1 output from the resolution detector 22 with the second resolution DF2 output from the resolution configuration unit 26. The condition-based determination unit 28 outputs a determination signal S3 indicating whether or not the resolutions match. The determination signal S3 is output to the output controller 30.

The output controller 30 refers to a result of comparison (S3) by the resolution determination unit 20 and outputs the analog video signal Dalg if the externally defined resolution DF2 matches the resolution DF1 of the image represented by the digital video data signal Ddig. If the resolutions do not match, the output controller 30 restricts the output of the analog video signal Dalg.

The output controller 30 may include a switch SW and a logic circuit 32. The analog video signal Dalg output from the encoding processor 10 is output to the external image device when the switch SW is turned on. When the switch SW is turned off, the output of the analog video signal Dalg is suspended.

The logic circuit 32 receives the output signal S1 of the externally-regulated controller 24 and the output signal S3 of the condition-based determination unit 28 and controls the on and off of the switch SW in accordance with the two signals. The logic circuit 32 turns the switch SW on if it is determined by the condition-based determination unit 28 that the two resolutions match and if the signal S1 permits the output. Conversely, if the two resolutions do not match or if the signal S1 does not permit the output of the analog video signal, the logic circuit 32 turns the switch SW off.

If it is desired that the high-vision analog video signal be not output from the video encoding apparatus 100 according to the embodiment, the second resolution DF2 may be configured to be lower than the high-vision resolution. In this case, if the resolution DF1 of the image represented by the digital video data signal Ddig is the high-vision resolution, the resolution DF1 does not match the second resolution DF2. Consequently, output of the high-vision analog video signal Dalg is suspended.

Even if the externally supplied control signal CMD is analyzed and the signal S1 is rewritten, output of the analog video signal Dalg is not permitted unless the first resolution DF1 and the second resolution DF2 match, with the result that robustness in protection is enhanced.

By configuring the video encoding apparatus 100 as a functional LSI, it is difficult to extract a signal between circuit blocks or functional blocks, with the result that robustness in protection is enhanced.

It is preferable in this embodiment that the output controller 30 be operable not only to turn the switch SW off, suspend the output of the analog video signal Ddig but also to suspend digital-to-analog conversion by the encoding processor 10. In this case, data can be protected more properly since the analog video signal is not generated in the first place.

The description of the invention given above is based upon the embodiment. The embodiment is illustrative in nature and various variations in constituting elements and processes involved are possible. Those skilled in the art would readily appreciate that such variations are also within the scope of the present invention.

Control on the output state imposed by the output controller 30 as described is directed to suspension of the output of the analog video signal Dalg. Alternatively, the output controller 30 may control the output state by reducing the resolution of the analog video signal. For this purpose, the video encoding apparatus 100 itself may be provided with a down converter. Alternatively, the video encoding apparatus 100 may direct the graphics processor 120 to reduce the resolution if the graphics processor 120 is provided with the function of controlling the resolution. Alternatively, the output state may be controlled by outputting an image irrelevant to the digital video data signal input to the video encoding apparatus 100.

While the resolution determination unit 20 in the described embodiment determines whether the resolution of the image represented by the digital video data signal Ddig matches the externally defined image resolution, the condition may be set in the resolution determination unit 20 in a variety of manners. For example, plural image resolutions may be defined externally. Alternatively, the resolution determination unit 20 may determine whether the resolution of the image represented by the digital video data signal Ddig is included in a range of resolutions defined in accordance with the externally defined image resolution.

While the video encoding apparatus 100 in the embodiment is described as being configured as a single LSI, the video encoding apparatus 100 may be integrated with the graphics processor 120.

While the preferred embodiments of the present invention have been described using specific terms, such description is for illustrative purposes only, and it is to be understood that changes and variations may be made without departing from the spirit or scope of the appended claims.

What is claimed is:

1. A video encoding apparatus which receives a digital video signal, converts the digital video signal into an analog video signal and outputs the analog video signal to an externally connected image device, comprising;

an encoding processor which converts the digital video data signal into the analog video signal;

a resolution determination unit which determines whether the resolution of an image represented by the digital video data signal satisfies a condition determined by an externally defined resolution; and an output controller which controls the state of output of the analog video signal to the image device, wherein the output controller refers to a result of determination by the resolution determination unit and, if the resolution of the image represented by the digital video data signal does not satisfy the condition, restricts the output of the analog video signal.

2. The video encoding apparatus according to claim 1, wherein the resolution determination unit comprises:

a resolution detector which detects the resolution of the image represented by the digital video data signal; and a condition-based determination unit which determines whether the resolution detected by the resolution detector satisfies a condition determined by the externally defined resolution, wherein the output controller controls the state of output of the analog video signal in accordance with an output signal of the condition-based determination unit.

3. The video encoding apparatus according to claim 1, wherein the externally defined resolution is lower than high-vision resolution.

4. The video encoding apparatus according to claim 2, wherein the externally defined resolution is lower than high-vision resolution.

5. The video encoding apparatus according to claim 1, wherein the output controller also refers to an externally supplied control signal to restrict the output of the analog video signal.

6. The video encoding apparatus according to claim 2, wherein the output controller also refers to an externally supplied control signal to restrict the output of the analog video signal.

7. The video encoding apparatus according to claim 1, wherein the restriction on the output state by the output controller is suspension of the output of the analog video signal.

8. The video encoding apparatus according to claim 2, wherein the restriction on the output state by the output controller is suspension of the output of the analog video signal.

9. The video encoding apparatus according to claim 7, wherein the output controller suspends digital-to-analog conversion by the encoding processor, when suspending the output.

10. The video encoding apparatus according to claim 1, wherein the restriction on the output state by the output controller is reduction in resolution of the analog video signal.

11. The video encoding apparatus according to claim 2, wherein the restriction on the output state by the output controller is reduction in resolution of the analog video signal.

12. The video encoding apparatus according to claim 1 which is configured as a functional circuit integrated on a semiconductor substrate.

13. The video encoding apparatus according to claim 2 which is configured as an functional circuit integrated on a semiconductor substrate.

14. An electronic appliance comprising:

the video encoding apparatus according to claim 1; and a digital video output unit which is provided parallel to the video encoding apparatus and which outputs the input digital video data signal in a predetermined digital format to the externally connected image device.

15. A video encoding method comprising:
receiving a digital video signal, converting the digital video signal into an analog video signal to be output to an image device;
determining whether the resolution of an image represented by the digital video data signal satisfies a condition determined by an externally defined resolution; and
restricting the output of the analog video signal to the image device if it is determined in the determining that the resolution of the image represented by the digital video data signal does not satisfy the condition.

* * * * *